(12) United States Patent
Engelhardt et al.

(10) Patent No.: US 6,909,540 B2
(45) Date of Patent: Jun. 21, 2005

(54) MICROSCOPE OBJECTIVE, MICROSCOPE, AND METHOD FOR IMAGING A SPECIMEN

(75) Inventors: Johann Engelhardt, Bad Schoenborn (DE); Rafael Storz, Heidelberg (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/308,608

(22) Filed: Dec. 2, 2002

(65) Prior Publication Data

US 2003/0103263 A1 Jun. 5, 2003

(30) Foreign Application Priority Data

Dec. 3, 2001 (DE) .......................................... 101 59 239

(51) Int. Cl.⁷ ............................................. G02B 21/00
(52) U.S. Cl. ........................ 359/379; 359/368; 359/376; 359/656
(58) Field of Search ................................. 359/368–390, 359/656–661, 694–706, 821, 811–830

(56) References Cited

U.S. PATENT DOCUMENTS

| | | | |
|---|---|---|---|
| 4,448,498 A | 5/1984 | Muller et al. ................ | 359/368 |
| 4,779,967 A | * 10/1988 | Murphy et al. ............. | 359/379 |
| 4,796,974 A | 1/1989 | Brakenhoff ................. | 359/368 |
| 4,863,252 A | * 9/1989 | McCarthy et al. .......... | 359/376 |
| 4,959,552 A | * 9/1990 | Saffert et al. .......... | 250/559.26 |
| 5,004,307 A | * 4/1991 | Kino et al. ................. | 359/356 |
| 5,532,874 A | * 7/1996 | Stein ........................... | 359/394 |
| 5,561,562 A | 10/1996 | Bender ........................ | 359/823 |
| 5,682,076 A | 10/1997 | Zumeris ...................... | 310/323 |
| 5,818,637 A | * 10/1998 | Hoover et al. .............. | 359/381 |
| 5,939,719 A | 8/1999 | Park et al. .................. | 250/306 |
| 5,994,820 A | 11/1999 | Kleindiek ................... | 310/329 |
| 5,995,143 A | * 11/1999 | Price et al. ................. | 348/345 |
| 6,137,627 A | 10/2000 | Engelhardt et al. ......... | 359/393 |
| 6,252,717 B1 | 6/2001 | Grosskopf ................... | 359/619 |
| 6,311,574 B1 | 11/2001 | Engelhardt et al. .......... | 74/10.7 |
| 6,507,433 B2 * | 1/2003 | Mecham et al. ............ | 359/379 |
| 6,628,459 B2 * | 9/2003 | Ue .............................. | 359/392 |

FOREIGN PATENT DOCUMENTS

| | | |
|---|---|---|
| DE | 3105018 | 9/1982 |
| DE | 3735324 | 6/1988 |
| DE | 4323721 | 1/1995 |
| DE | 4440758 | 5/1996 |
| DE | 19541237 | 5/1996 |
| DE | 196 51 667 | 9/1997 |
| DE | 19650392 | 2/1998 |
| DE | 19822256 | 12/1999 |
| DE | 19924709 | 12/2000 |
| GB | 889884 | 2/1962 |
| JP | 07 333480 | 12/1995 |
| JP | 2000 187146 | 7/2000 |
| JP | 2001-356256 | * 12/2001 ................. 359/368 |

* cited by examiner

Primary Examiner—Thong Q Nguyen
(74) Attorney, Agent, or Firm—Davidson, Davidson & Kappel, LLC

(57) ABSTRACT

A microscope objective that comprises an objective housing and contains several lens elements, at least one lens element being arranged displaceably in motor-driven fashion within the objective housing, is disclosed. A microscope and a method for imaging a specimen are additionally disclosed.

21 Claims, 3 Drawing Sheets

MICROSCOPE OBJECTIVE, MICROSCOPE, AND METHOD FOR IMAGING A SPECIMEN

CROSS REFERENCE TO RELATED APPLICATIONS

This application claims priority of the German patent application 101 59 239.6 which is incorporated by reference herein.

FIELD OF THE INVENTION

The invention concerns a microscope objective. The invention furthermore concerns a microscope having a microscope objective. The invention moreover concerns a method for imaging a specimen.

BACKGROUND OF THE INVENTION

It is usual in microscopy to bring the specimen, or the region of the specimen that is to be sharply imaged, into the focal plane of an objective. To do so, the specimen (which is usually mounted on a specimen stage) or the objective is displaced along the optical axis. Many microscopes are equipped with objective turrets in which several different objectives can be kept on hand. Often the entire revolving turret is mounted displaceably for focusing. In order to allow automatic focusing, the various systems are equipped with motors for displacing the objective or turret, or the specimen stage.

Microscope objective positioning systems that are arranged between the objective turret and the objective are known. These microscope objective positioning systems make it possible to displace the objective in the direction of the optical axis relative to the turret. The company styled Physik Instrumente, for example, markets piezo-controlled systems of this kind.

German Application DE 43 23 721 A1 discloses a microscope objective that comprises at least one correction mount for compensating for different coverslip thicknesses. The correction mount is axially displaceable and simultaneously rotatable about the optical axis of the objective. Jamming of the correction mount is thereby prevented.

German Application DE 37 35 324 discloses a microscope objective having a correction mount in particular for plane-parallel plates of different thicknesses in the specimen area, a front lens element and a rear lens group being arranged on the image side of a modifiable air gap. The correction mount is configured such that simultaneously with the modification of the air gap for aberration correction, an axial displacement of the entire optical system is performed in order to correct the location of the plane of focus.

German Application DE 31 05 018 A1 discloses an surgical microscope having an objective with two lens elements, whereby the back focus distance is changed by axially displacing one of the lens elements.

U.S. Pat. No. 4,796,974 discloses an apparatus for focusing electromagnetic waves. The apparatus contains a holder movable in three mutually perpendicular directions. Drive units for moving the holder in the three directions are provided. The apparatus can be used in a microscope and in a confocal scanning microscope.

In scanning microscopy, a specimen is illuminated with a light beam in order to observe the reflected or fluorescent light emitted by the specimen. The focus of an illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the detected light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels back through the beam deflection device to the beam splitter, passes through it, and is then focused onto the detection pinhole behind which the detectors are located. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers, the track of the scanning light beam on or in the specimen ideally describing a meander (scanning one line in the X direction at a constant Y position, then stopping the X scan and slewing by Y displacement to the next line to be scanned, then scanning that line in the negative X direction at constant Y position, etc.). To allow image acquisition in layers, the specimen stage or the objective is displaced after a layer is scanned, and the next layer to be scanned is thus brought into the focal plane of the objective.

German Patent Application DE 196 50 392 A1 discloses a fine-focus stage for microscopes having a specimen plate, a retainer for the specimen plate, and an adjustment device that modifies the horizontal position of the specimen plate. In order to implement a parallel linear stroke of the specimen plate with a simple design, the fine-focus stage is configured in such a way that the retainer comprises a mounting region, preferably for attachment to a specimen stage or to the microscope, and a connecting region (5) toward the specimen plate; and that parallel arms articulated via bending points extend between the mounting region and the connecting region.

German Patent Application DE 199 24 709 A1 discloses an apparatus for fine positioning of a component, in particular for vertical fine positioning of an objective or an objective turret, having a lever arrangement and a drive system for the lever arrangement. The apparatus is characterized in that the lever arrangement acts directly on a rotary part; that the component is flexibly connected to the rotary part; and that the connection is implemented in the manner of a suspension system for the component that, upon rotation of the rotary part, modifies the position of the component by way of rolling contact of the flexible connection on the rotary part, thereby bringing about a linear motion of the component.

German Unexamined Application DE 44 40 758 A1 discloses an electromechanical positioning unit as an inertial drive for positioning specimens, having positioning precision down to the atomic scale and positioning travels up to the centimeter range. The positioning unit contains at least one preferably tubular piezoelectric actuator for transferring electrically controllable inertial motions to a rotor. The subject matter of the invention is a rotor that comprises at least one unit of greater mass (mass unit) and at least one flexibly bendable unit (bending unit), so that the magnitude of the frictional adhesion is adjustable by way of the bending unit(s) of the rotor, and the mass unit of the rotor ensures a high load-carrying capacity for the positioning unit. By means of this combination, the positioning unit can be used to position even heavier specimens, and the forces necessary for use as a tool can be exerted.

U.S. Pat. No. 5,682,076 discloses a piezoelectric micromotor for a disk drive.

The known systems for scanning a specimen along the optical axis and for focusing onto a specimen have the disadvantage that because of the large masses being moved, they are necessarily sluggish and slow. The apparatuses arranged between the turret and objective furthermore have the disadvantage that the optical path (tube length) is considerably lengthened.

SUMMARY OF THE INVENTION

It is therefore the object of the invention to describe a microscope objective that, with a compact design, makes possible rapid focusing or rapid scanning of a specimen in the direction of the optical axis (Z scan).

The object is achieved by a microscope objective comprising:

an objective housing, several lens elements, which are together displaceable within the objective housing and a drive unit for effecting a displacement of the several lens elements.

A further object of the invention is to describe a microscope that makes possible rapid focusing, in particular rapid autofocus, or rapid scanning of a specimen in the direction of the optical axis (Z scan).

The object is achieved by a microscope comprising:

a microscope objective with an objective housing and with several lens elements, which are together displaceable within the objective housing, and a drive unit for effecting a displacement of the lens elements.

A further object of the invention is to describe a method that makes possible rapid imaging of a specimen or rapid imaging of regions of a specimen in a selectable scanning plane.

The above object is achieved by means of a method which is characterized by the following steps:

selecting a scanning plane;

establishing the scanning plane using a microscope objective that comprises an objective housing and contains several lens elements, at least one lens element being arranged displaceably in motor-driven fashion within the objective housing;

scanning the specimen within the scanning plane that has been established, and generating image data.

The invention has the advantage that the microscope objective is insertable into any microscope. An additional advantage of the invention is that because of the small masses being moved, both rapid scanning of a specimen in the Z direction (along the optical axis) and rapid focusing are enabled. A particular advantage of the invention, furthermore, is the fact that the entire turret of a microscope is usable, in contrast to systems that are mounted between the turret and the objective and protrude laterally to such an extent that no further objectives can be positioned in the turret. A further advantage of the invention is the fact that easy changing of the objectives is not impaired.

BRIEF DESCRIPTION OF THE DRAWINGS

The subject matter of the invention is depicted schematically in the drawings and will be described below with reference to the Figures, identically functioning elements being labeled with the same reference characters. In the drawings.

DETAILED DESCRIPTION OF THE INVENTION

Figure 1:
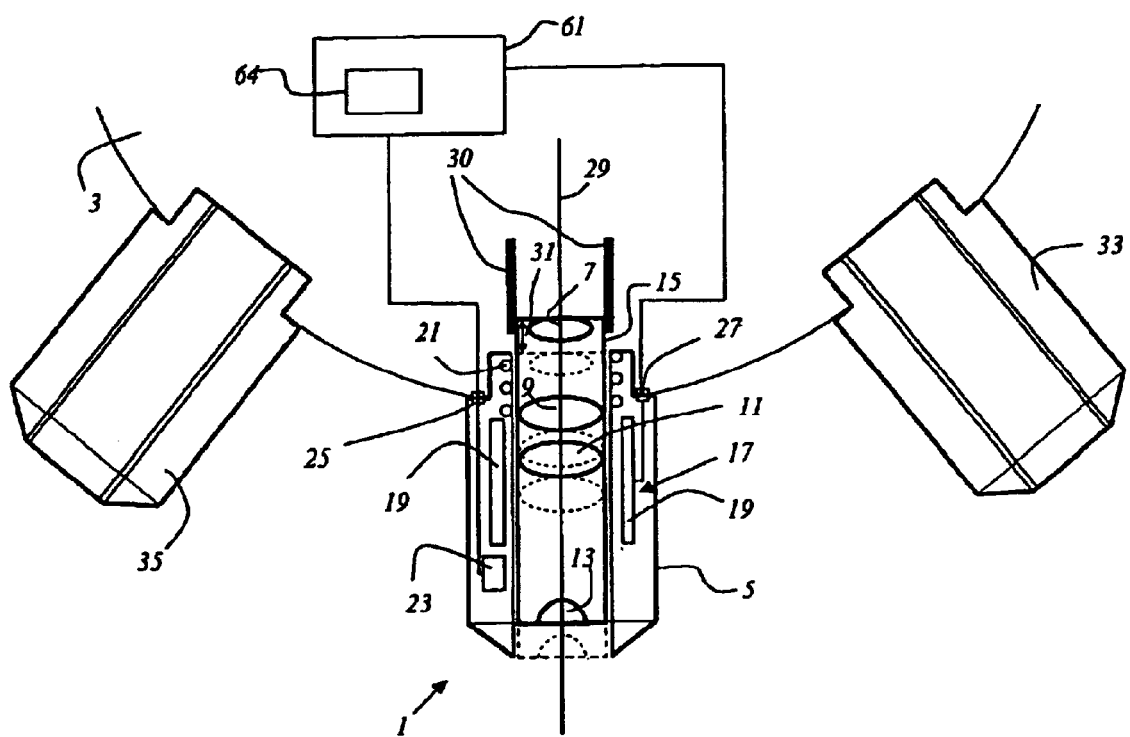
FIG. 1 shows a microscope objective in a turret.

In a preferred embodiment, all the lens elements are arranged to be displaceable together for focusing. In another embodiment several lens elements, which are arranged together in a mount, are combined into at least one lens group, the mount being displaceable. A guidance element, which ensures that displacement takes place substantially along the optical axis, is preferably provided.

In a particularly preferred embodiment, a drive unit that effects the motor-driven displacement is provided. The drive unit preferably contains at least one piezoelement. The drive unit can also encompass a galvanometer or a motor or a piezomotor. An embodiment that contains as the drive unit an electromechanical positioning unit as an inertial drive, having positioning precision down to the atomic scale and positioning travels up to the centimeter range. The positioning unit contains at least one preferably tubular piezoelectric actuator for transferring electrically controllable inertial motions to a rotor. The rotor comprises at least one unit of greater mass (mass unit) and at least one flexibly bendable unit (bending unit), so that the magnitude of the frictional adhesion is adjustable by way of the bending unit(s) of the rotor, and the mass unit of the rotor ensures a high load-carrying capacity for the positioning unit. The drive unit can, for example, also act on the displaceable lens elements inductively, capacitatively, or by vacuum suction.

A linkage or a threaded drive can also be provided. A spring that exerts a return force directed oppositely to the force exerted by the drive element is preferably provided. This advantageously increases reproducibility and compensates for inaccuracies caused, for example, by thread clearances.

In a variant embodiment, a position detector which ascertains the present position of the displaceable lens elements is provided. The position detector preferably generates electrical signals that can be transferred to a control system. Position detectors are widely known. Capacitative or optical rangefinders, glass scales, or the use of limit switches may be mentioned merely as general examples.

According to the present invention, a microscope objective that comprises an objective housing and contains several lens elements, at least one lens element being arranged displaceably within the objective housing for focusing, can be introduced into a working position within the microscope.

A particular embodiment of the microscope is configured such that the objective housing encloses the drive unit, in another embodiment, the turret contains the drive unit. Provision can also be made for the turret to encompass several drive units, a separate drive units being provided for each objective screwed into the turret. In another variant embodiment, the entire objective or the entire turret is displaceable in known fashion for coarse focusing. In this variant, the lens elements displaceable within the objective housing are used for fine focusing.

The microscope preferably contains a position detector that senses the position of the at least one lens element and transmits that information to a control system that controls the drive unit. In a particularly preferred variant, the control system contains an autofocus system.

The microscope is preferably embodied as a scanning microscope, in particular as a confocal scanning microscope, or as a deconvolution microscope. In a scanning microscope, scanning in the Z direction is preferably synchronized with the scanning mechanism that brings about scanning in the X and Y direction. In a preferred embodiment, scanning segments of any physical location are enabled. The synchronization system can additionally be designed so that aberrations (for example the flatness aberration) of the optical systems, in particular of the objective, are compensated for by the fact that the control system, for example, establishes a different Z position in the image edge region than at the center of the image.

In a variant, the method contains the further steps of selecting a further scanning plane, establishing the further scanning plane with the microscope objective, scanning the specimen within the further scanning plane that has been established and generating further image data, and generating an image stack from the image data and the further image data.

In an embodiment, the scanning refers to an image point. In a further variant, the scanning refers to a line. In a preferred embodiment, the method encompasses scanning of a surface (or an area), in which context the surface can have any position in space but preferably is an X-Y section. With the method according to the present invention, it is advantageously possible to image X-Z sections or Y-Z sections quickly.

The method can preferably be carried out with a scanning microscope, in particular with a confocal scanning microscope. The method can be carried out with a deconvolution microscope.

In a particularly preferred embodiment, the protective mechanism already present in many conventional objectives, in which at least the front lens element or the entire lens group is pushed in backward against a spring force in the event of inadvertent contact with the specimen, is utilized according to the present invention by the fact that a drive unit directly displaces the lens elements of the protective mechanism.

FIG. 1 shows a microscope objective 1 that is screwed into a turret 3. Within microscope objective 1, which comprises an objective housing 5, all the lens elements 7, 9, 11, 13 are mounted in a sleeve 15 that is displaceable in the direction of optical axis 29. Displacement of the sleeve is effected by a drive unit 17 that is arranged inside the objective housing. A guidance element 30 ensures that displacement takes place substantially along optical axis 29. Drive unit 17 is embodied as piezomotor 19. A helical spring 21 presses sleeve 15 into an end position. Sleeve 15, along with lens elements 7, 9, 11, 13, are depicted in the end position in FIG. 1 using dashed lines. Drive unit 17 exerts a force directed oppositely to the spring force, so that helical spring 21 is compressed by the displacement of sleeve 15. Incorporated into objective housing 5 is a position detector 23 that ascertains the present position of the sleeve and transmits the information in the form of electrical signals, via contact point 25 between microscope objective 1 and the turret, to a control system 61. Control system 61 includes autofocus system 64. Further contact points 27 are provided between the turret and microscope objective 1 for the transmission of control signals to the drive unit. Double arrow 31 illustrates the focusing movement in the direction of optical axis 29. By pivoting turret 3, a second microscope objective 33 or a third microscope objective 35 can be brought into the working position with no need for further modification.

Figure 2:
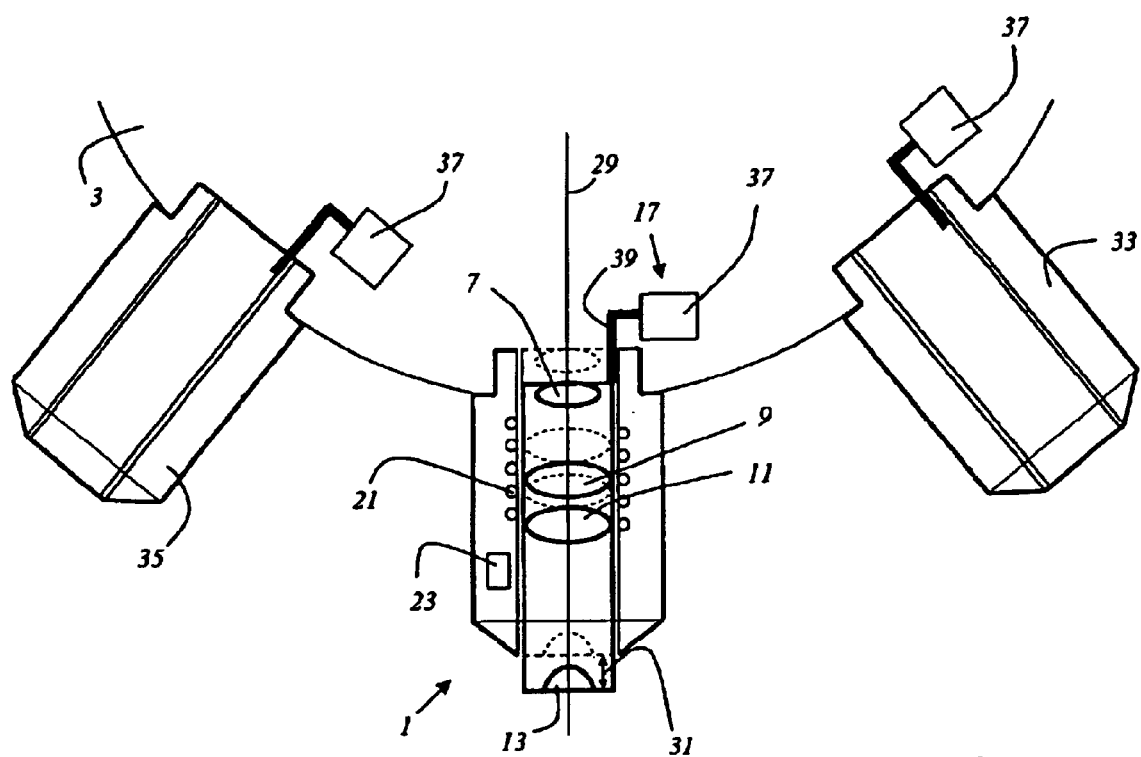
FIG. 2 shows a further microscope objective in a turret.

FIG. 2 shows a microscope objective 1 in a turret 3. In this embodiment, a drive unit 17 embodied as a galvanometer 37 is arranged in turret 3, said drive unit 17 effecting the displacement of sleeve 15, in which lens elements 7, 9, 11, 13 are mounted, via a pusher linkage 39. Drive unit 17 is configured such that it functions as drive unit 17 for the focusing or scanning mechanism of the second or third microscope objective 33, 35. A helical spring 21 presses sleeve 15 into an end position that is drawn with dashed lines. Drive unit 17 exerts a force directed oppositely to the spring force, so that helical spring 21 is pulled apart by the displacement of sleeve 15. As with microscope objective 1 shown in FIG. 1, a position sensor 23 is incorporated into microscope objective 1. It would also be possible, however, to derive the position of the sleeve from the position of the pusher linkage. Double arrow 31 illustrates the focusing movement or scanning movement in the direction of optical axis 29.

Figure 3:
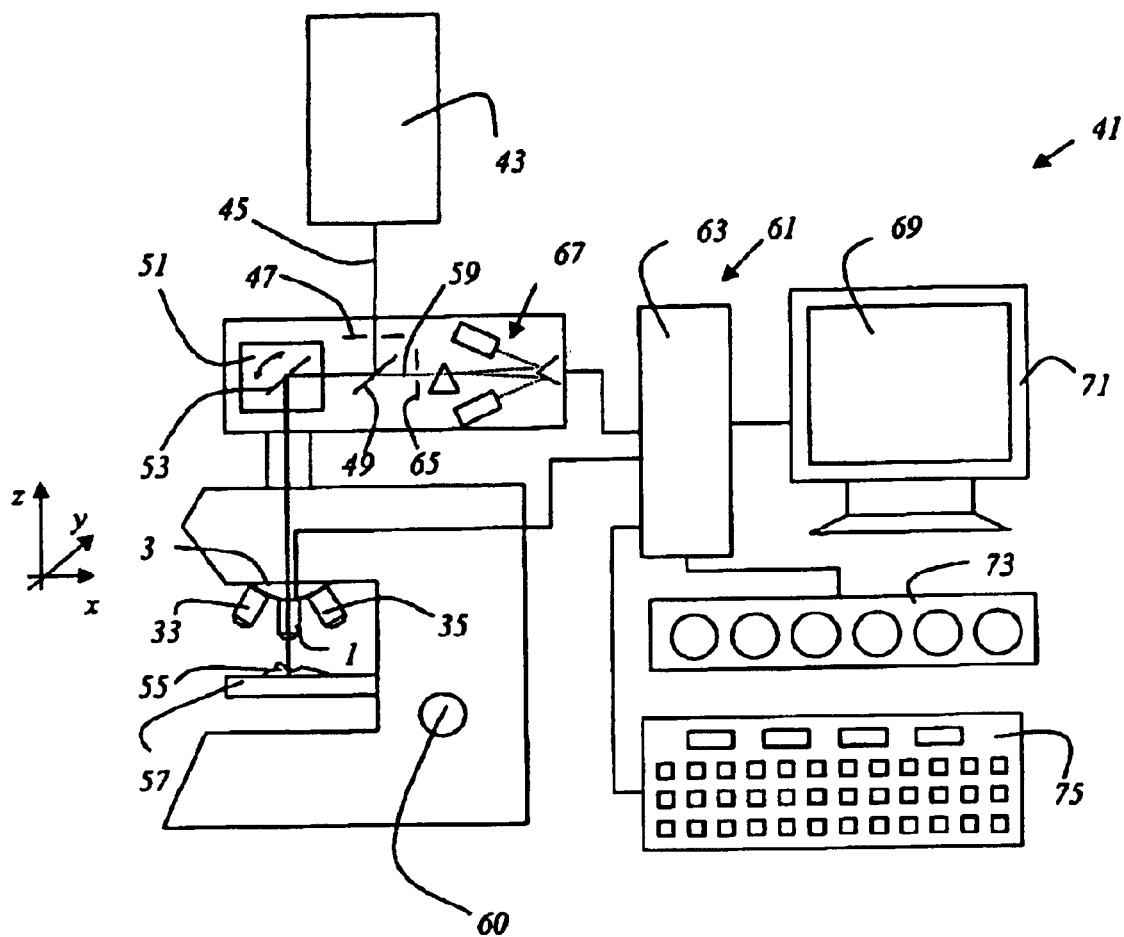
FIG. 3 shows a confocal scanning microscope.

FIG. 3 schematically shows a microscope 41 that is configured as a confocal scanning microscope. Microscope 41 comprises a laser 43 that emits an illuminating light beam 45. After passing through an excitation pinhole 47, illuminating light beam 45 is reflected by a beam splitter 49 to scanning module 51, which contains a gimbal-mounted scanning mirror 53 that guides illuminating light beam 45, through several optical systems (not shown) and through microscope objective 1, over or through a specimen 55. Microscope objective 1 is screwed into a turret 3 that carries a second microscope objective 33 and a third microscope objective 35 in reserve positions. In the case of non-transparent specimens 55, illuminating light beam 45 is guided over the specimen surface. With biological specimens 55 (preparations) or transparent specimens 55, illuminating light beam 45 can be guided through specimen 55. For coarse adjustment of the Z position of specimen 55, specimen stage 57 on which specimen 55 lies is displaceable in the Z direction. The displacement is performed mechanically via a precision linkage, by way of rotary knob 60. Once a first X-Y section plane of the specimen has been scanned, control system 61, which is embodied as PC 63, establishes with microscope objective 1 the next X-Y section plane that is to be scanned. Within microscope objective 1, all the lens elements (not shown in the Figure) are mounted in a sleeve that is displaceable in the direction of the optical axis. Displacement of the sleeve is brought about by a drive unit (not shown) that is arranged inside the objective housing. The drive unit is embodied as a piezomotor and is controlled by PC 63. This means that different focal planes of specimen 55 are successively scanned by the focus of light beam 45. Subsequent assembly then yields a three-dimensional image of specimen 55. Detected light 59 proceeding from specimen 55 travels through microscope objective 1 and the further optical systems (not shown) and via scanning module 51 back to beam splitter 49, passes through the latter and, after passing through detection pinhole 65, strikes a detector 67 which is embodied as a multi-band detector. Detected light 59 proceeding from specimen 55 is depicted in the Figure with dashed lines. In detector 67, electrical detected signals proportional to the power level of detected light 59 proceeding from specimen 55 are generated and forwarded to PC 63. The detected signals are assembled in PC 63 into an image 69 of specimen 55 and outputted on a display 71 in a red/green depiction. A control console 73 having rotary controllers and a keyboard 75 is provided for selecting a scanning plane and for determining an image stack that is to be scanned.

The invention has been described with reference to a particular embodiment. It is self-evident, however, that changes and modifications can be made without thereby leaving the range of protection of the claims below.

What is claimed is:

1. A microscope objective comprising:
   an objective housing,
   several lens elements, which are together displaceable within the objective housing
   an electrical drive unit for effecting a displacement of the several lens elements in the objective housing along an optical axis of the lens elements, and
   a control system configured to control the drive unit so as to provide autofocus.

2. The microscope objective as defined in claim 1, wherein the several lens elements are arranged together in a mount.

3. The microscope objective as defined in claim 1 further comprising a guidance element.

4. The microscope objective as defined in claim 3, wherein the drive unit contains at least one piezoelement.

5. The microscope objective as defined in claim 1, further comprising:
   a spring that exerts a return force directed oppositely to the force exerted by the drive unit.

6. A microscope comprising:
   a microscope objective with an objective housing and with several lens elements, which are together displaceable within the objective housing, an electrical drive unit for effecting a displacement of the lens elements in the objective housing along an optical axis of the lens elements, and a control system configured to control the drive unit so as to provide autofocus.

7. The microscope as defined in claim 6, wherein the several lens elements are arranged together in a mount.

8. The microscope as defined in claim 6, further comprising a turret with which the microscope objective can be brought into a working position.

9. The microscope as defined in claim 8, wherein the turret contains the drive unit.

10. The microscope as defined in claim 8, wherein the turret encompasses several drive units.

11. The microscope as defined in claim 8, wherein a position detector that senses the position of the several lens elements is provided.

12. The microscope as defined in claim 6, further comprising a guidance element.

13. The microscope as defined in claim 6, wherein the drive unit contains at least one piezoelement.

14. The microscope as defined in claim 6, wherein a spring that exerts a return force directed oppositely to the force exerted by the drive unit is provided.

15. The microscope as defined in claim 6, wherein the objective housing encloses the drive unit.

16. The microscope as defined in claim 6, wherein the microscope is a scanning microscope.

17. A method for imaging a specimen, comprising the steps of:
   selecting a scanning plane;
   establishing the scanning plane using a microscope objective that comprises an objective housing and contains several lens elements, at least one lens element being arranged displaceably in electrically-driven fashion in the objective housing along an optical axis of the lens elements;
   controlling displacement of the at least one lens element along the optical axis so as to provide autofocus; and
   scanning the specimen within the scanning plane that has been established, generating image data.

18. The method as defined in claim 17, comprising the further steps of:
   selecting a further scanning plane;
   establishing the further scanning plane with the microscope objective; and
   scanning the specimen within the further scanning plane that has been established and generating further image data; and
   generating an image stack from the image data and the further image data.

19. The method as defined in claim 17, wherein the scanning refers to an image point or to a line or to a surface or to an area.

20. The microscope as defined in claim 17, wherein the steps are carried out with a scanning microscope.

21. The microscope as defined in claim 17, wherein the steps are carried out with a deconvolution microscope.

* * * * *